United States Patent [19]

Yang et al.

[11] Patent Number: 5,241,374
[45] Date of Patent: Aug. 31, 1993

[54] METHOD AND APPARATUS FOR AUTOMATICALLY ADJUSTING DYNAMIC COLOR TEMPERATURE STATE OF COLOR TV EQUIPMENT

[75] Inventors: Yanhua Yang; Ruihong Li, both of Kunming, China

[73] Assignee: Yunnan TV Factory, China

[21] Appl. No.: 755,638

[22] Filed: Sep. 6, 1991

[30] Foreign Application Priority Data

Sep. 9, 1990 [CN] China .................. 90107671.6

[51] Int. Cl.⁵ .............................................. H04N 9/73
[52] U.S. Cl. .................................... 358/29; 358/40
[58] Field of Search ............... 358/29, 29 C, 40, 41

[56] References Cited

U.S. PATENT DOCUMENTS

| | | | |
|---|---|---|---|
| 4,701,788 | 10/1987 | Desjardins | 358/29 |
| 4,709,262 | 11/1987 | Spieth et al. | 358/74 |
| 4,942,459 | 7/1990 | Hieda et al. | 358/41 |
| 5,021,874 | 6/1991 | Tsugita | 358/29 C |
| 5,047,861 | 9/1991 | Houchin et al. | 358/29 C |
| 5,099,313 | 3/1992 | Suemoto et al. | 358/29 |
| 5,099,316 | 3/1992 | Ogawa | 358/29 |

FOREIGN PATENT DOCUMENTS

| | | |
|---|---|---|
| 0172754 | 2/1986 | European Pat. Off. |
| 0322791 | 7/1989 | European Pat. Off. |
| 0292492 | 12/1986 | Japan |
| 62-268227 | 11/1987 | Japan |
| 62-268290 | 11/1987 | Japan |
| 62-268291 | 11/1987 | Japan |
| 62-268292 | 11/1987 | Japan |
| 0153986 | 6/1988 | Japan |
| 2149267A | 6/1985 | United Kingdom |

OTHER PUBLICATIONS

IEEE Transactions on Consumer Electronics, Feb., 1976, "A Chrominance Demodulator IC with Dynamic Flesh Correction", by L. A. Harwood, pp. 341-347.

Primary Examiner—James J. Groody
Assistant Examiner—Jeffrey S. Murrell
Attorney, Agent, or Firm—Hill, Steadman & Simpson

[57] ABSTRACT

Present color TV equipment utilizes single fixation whitebalance color temperature reference programs. Such equipment can not give consideration to various disadvantages in image reproducing results. The method and the apparatus disclosed can correct color TV equipment with a dynamic color temperature state using an applicable range along a Planckian locus color temperature band as a white-balance color temperature parameter region, and can make the corresponding relation between hue - color temperature parameters meet requirements of an optimum image reproducing result. Therefore, the reproducing results and the quality of a general appearance of a color TV picture are improved. It is also possible to produce or improve color TV equipment with low cost.

7 Claims, 4 Drawing Sheets

METHOD AND APPARATUS FOR AUTOMATICALLY ADJUSTING DYNAMIC COLOR TEMPERATURE STATE OF COLOR TV EQUIPMENT

BACKGROUND OF THE INVENTION

The present invention relates to the processing of color TV chrominance, and more particularly to a method and apparatus for automatically adjusting dynamic color temperature state of color TV equipment such as pick-up equipment, transmitting equipment, receiving equipment, and playing equipment.

The color-temperature process of existing color TV equipment uses a single fixation method, that is, the single fixation white color temperature reference standard is used for setting up the white balance of a color TV pick-up equipment or receiving equipment. The equipment work state at the same time is used to relatively determine the functional relation between the chrominance signal input and output in a chrominance channel circuit. The functional relation will remain unchanged when the equipment processes any white or non-white image signal. Up to now, many TV technology groups in different countries in the world are still not in agreement on the point about the sampling locus of the above single fixation color temperature reference standard. The standard white light recommended presently by CIE, i.e. the Committee of International Emittance, is D65 white light with a relative color temperature of 6504 K. This standard is used in the present color TV system of PAL and SECAM. Another standard of C white light with a relative color temperature of 6770 K is used in the NTSC system. A standard of D93 with a relative color temperature of 9300 K is used in some countries. In China, the standard white light for color TV Broadcasts is D65, but there is a stipulation that "the white color temperature to be set up in production of color TV receivers may be stipulated by the professional standard according to subjective evaluation." In practice and similar to foreign enterprises, the standard is set at D65 in some enterprises or D93 in other enterprises (hereinafter abbreviated as D65 set or D93 set). Because the D65 and D93 standards have their own advantages, there is thus the phenomenon that the standard can not be unified. In television pickup and receiving systems, a color temperature is now usually chosen to be a regular white color temperature standard, and usually D65 or D93 (5400 K for pickup equipment) is chosen. According to the condition shown by receiving equipment, none of the D65, D93 or 5400 K can give consideration to the reproducing effects of various images. They have their own qualitative range and separate inferior faulty range. When reproducing white color, D93 equipment appears quite white and very clean. When reproducing a natural landscape in which there are mainly the contents of blue and green colors, there appears to be good scenery and depth of field, plentiful stratification, a distinct picture, bright colors, and more lifelike. But when reproducing the color of skin, the skin appears dark green sometimes. When reproducing a person's features, it appears more stiff. When reproducing red color, it appears overly purple sometimes. When reproducing the color of skin, the D65 equipment appears ruddy and soft. When reproducing red color, it appears bright and lifelike. But when reproducing white color, it appears over-red. When reproducing a natural landscape in which there are mainly the contents of blue and green color, it appears withered and yellow and looks like the scenery is covered with a layer of brown dust, sometimes. The "sometimes" mentioned above refers mainly to when there are not many differences between the ratios which every primitive color holds. The above conclusion can be supported by the results obtained in the first Chinese meeting comparing and assessing the quality of color TV receivers in 1987. During the comparing and assessing, its published evaluation report points out:

"It is satisfactory that D65 white color-temperature reproduces the color of skin. If the white color temperature has some deviation, an obvious difference in the colors of skin will occur so that the adjusting of white color temperature has an important bearing on receiving a color picture."

"Given the same brightness, 9300 K white color temperature has a more bright sense than 6500 K white color temperature, so that when receiving landscape, sample equipment of 9300 K color-temperature had higher marks than those of 6500 K color-temperature because they appeared to provide good scenery and depth of field, distinct picture and bright color."

The technical summary of the evaluation points out again:

"When reproducing memory colors, such as the color of skin and background, D65 white color temperature is beyond comparison with the other color temperature, but when reproducing the picture in which there are mainly the contents of blue and green color, it appears to have a less bright-colored level than higher color-temperature . . . (relative to D65) if the color temperature is much higher, the result reproducing the color of skin will be worse."

The main reasons for the above statements are as follows:

1. For the same image signal, the ratios of three primary colors of the reproduced image from different systems which have different reference standards of color temperature are different. The D65 receiver offers a 41.4% red component more than the D93 receiver. But the D65 receiver offers a 14.4% blue component less than the D93 receiver.

Assume an affine transformation to transfer the CIE chrominance figure from the XYZ system to the three base color system which is formally used in the technical standards in China. Suppose that the coordinates in the XYZ system for any color value (F) are ($X_F$, $Y_F$, $Z_F$, and the coordinates in the RGB system for the same color value (F) are ($r_F$, $g_F$, $b_F$), then the following formula of coordinate transformation results:

$$\begin{pmatrix} r_F \\ g_F \\ b_F \end{pmatrix} = \begin{pmatrix} 2.0608 & -0.9374 & -0.3201 \\ -1.1415 & 2.2094 & 0.0489 \\ 0.0807 & -0.2720 & 1.2712 \end{pmatrix} \begin{pmatrix} X_F \\ Y_F \\ Z_F \end{pmatrix}$$

Bringing the coordinates (0.313, 0.329, 0.358), (0.281, 0.311, 0.408) in the XYZ system for D65 and D93 into the above formula, the following relative coordinates in the RGB system result:

$$(D65) = \begin{pmatrix} 0.222 \\ 0.387 \\ 0.391 \end{pmatrix} \quad (D93) = \begin{pmatrix} 0.157 \\ 0.386 \\ 0.457 \end{pmatrix}$$

Therefore, the reference white of D65 or D93 may be founded in the following mixed form:

(D65)=0.222(R)+0.387(G)+0.391(B)

(D93)=0.157(R)+0.386(G)+0.457(B).

From the above two formulas, we can see that, when two TV receivers display the same pictures, i.e. when their matrix circuits get the same drive voltage, their output voltages are different so that the ratio of the base color in the color appearing on the viewing screen is also different. Thus, the red component in the D65 receiver is 41.4% more than that in the D93 receiver {(0.222−0.157)/0.157}, the blue component in the D65 receiver is 14.4% less than that in the D93 receiver {(0.457−0.391))/0.457 }, and the green component in both of the D65 and D93 receivers may be considered as the same, because there is only a 0.2% difference.

2. The influence of the illumination source to the chrominance of the object is extensive, but the color temperature from different light sources disperses from 2000 K to 28000 K. The scenery objects appearing in many conditions are actually exposed under the light of the sky. And the color temperature from the sky light is usually higher than 6500 K, for example, the color temperature for the blue sky is from 10,000 K to 12,000 K, and for a blue sky with thin clouds, from 14,000 K to 22,000 K. Therefore, the D65 can not represent the chrominance of the object under the above conditions. For the same reason, it is also impossible for D93 to represent the chrominance of the object directly irradiated from some artificial light sources or sunlight.

SUMMARY OF THE INVENTION

An object of the present invention is to provide a method and an apparatus by which the color-temperature parameters of white balance in the equipment may be dynamically dealt with and worked in the dynamic color-temperature state which is set according to the qualitative range of a reproduced picture, and which avoids the inferior faulty range of a reproduced picture. Therefore, one can eliminate the intrinsic disadvantage from which it is difficult, for present TV equipment designed according to the single fixation white balance scheme of color-temperature reference standards, to take into account all of the reproducing effects of the picture. Therefore, it can make the reproducing effects of the picture more lifelike, and the subjective evaluation effects more perfect for the color TV.

A system of the invention for automatically adjusting dynamic color temperature of color TV equipment according to the invention functions as follows.

The applicable range along a Planckian locus color-temperature band (i.e., 2000 K–28000 K mentioned below, especially the range of 5400 K–9300 K which error should be less than or equal to ±27 MPCD) is provided as the reference standard of dynamic color temperature of the white-balance color-temperature parameter for the dynamic color temperature condition of color TV equipment. This is a kind of work condition wherein white-balance color-temperature parameters are in the dynamic characters for the equipment in which (and as relatively determined by) the functional relation between the values of input and output of the chrominance signal remain stationary when the equipment reproduces any hue image.

According to the instantaneous hue characters of the image element points in every scanning line of the image at a 52 μs forward stroke, a relative automatic apparatus is used for automatic adjusting.

When the chrominance channel circuit is input with a warm color chrominance signal (i.e., the primary color structure is an R signal level that is greater than a G signal level and a B signal level), and given an accurate design, all or some portions of the low color temperature region in the range between 2000 K and 9300 K, especially 5400 K and 9300 K or 6504 K and 9300 K, is adopted as white, on condition that an approximate design is allowed. One or several points in the previous region are used as a dynamic color-temperature standard called a bottom color-temperature standard D1.

When a chrominance channel circuit is input with the chrominance signal of the other hue signal, and given an accurate design, the range between the previous bottom color-temperature standard D1 (in which the upper limit of D1 is adopted when D1 is in a part of the previous continuous region or several points) and 28000 K, especially 9300 K or some range portion among the ranges, is used. But if an approximate design is allowed, one or several points in the previous range are used as a dynamic color-temperature standard called a top color-temperature standard $D_H$.

Given an accurate design, the upper limit of the bottom color-temperature standard $D_L$ must be fixed at the lower limit of the top color-temperature standard (the above stipulations about the relation between hue and color-temperature parameters are called correspondence principles of hue and color-temperature parameters).

In the course of adjusting a dynamic color-temperature state automatically, and when the white-balance color-temperature parameter is adjusted from an arbitrary value $K_0$ (corresponding normalized primary color quantities are $R_0$, $G_0$, $B_0$ and brightness $Y_0$) to an arbitrary value $K_1$ which is less than $K_0$ (corresponding normalized primary color quantities are $R_1$, $G_1$, $B_1$ and brightness is $Y_1$), the following should be satisfied:

1) the deviation of the points $(X_0, Y_0)$, $(X_1, Y_1)$ on a CIE chrominance chart which correspond to the points $(R_0, G_0, B_0)$, $(R_1, G_1, B_1)$ in the RGB color space from the corresponding points $K_0$, $K_1$ in the Planckian locus should separately be less than or equal to ±27 MPCD; and 2) except for slunt treatment, the following inequality should be satisfied:

$0 \leq |Y_1 - Y_0| = |0.3(R_1-R_0)+0.59(B_1-B_0)+0.11(G_1-G_0)| \leq 0.15$.

DESCRIPTION OF THE PREFERRED EMBODIMENTS

Figure 1:
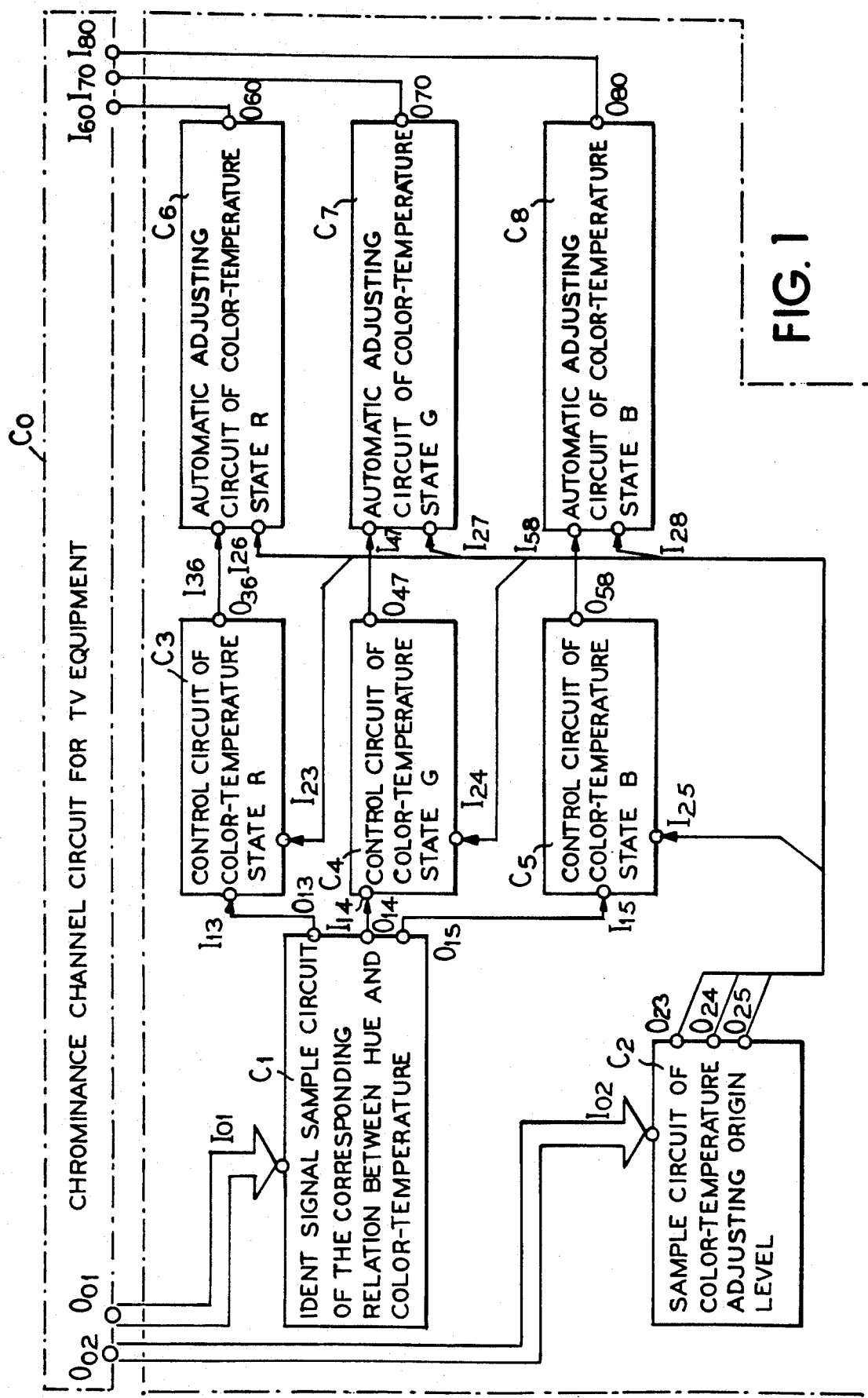
FIG. 1 illustrates an apparatus for automatically adjusting dynamic color temperature of color TV equipment.

A system for automatically adjusting dynamic color temperature state of color TV equipment according to the invention is described as follows.

Referring to Figure an input interface $I_{01}$ of a chrominance signal sample, an output interface $0_{13}$ of an ident signal R of a color-temperature region, an output interface $0_{14}$ of an ident signal G of the color-temperature range, and an output interface $0_{15}$ of an ident signal B of the color-temperature range are connected to a sample ident signal circuit $C_1$ with the corresponding relation for hue to color-temperature. The output interfaces $0_{13}$, $0_{14}$, $0_{15}$ are separately connected with an input interface $I_{13}$ of the ident signal R of the color-temperature range in a control circuit $C_3$ of the color-temperature state R, with an input interface $I_{14}$ of the ident signal G of the color-temperature range in a control circuit $C_4$ of the color-temperature state G, and with an input interface $I_{15}$ of the ident signal B of the color-temperature range in a control circuit $C_5$ of the color-temperature state B.

An output interface $O_{36}$ of an R control signal in the R control circuit $C_3$, an output interface $O_{47}$ of the G control signal in the G control circuit $C_4$, and an output interface $O_{58}$ of the B control signal in the B control circuit $C_5$ are separately connected with an input interface $I_{36}$ of the R control signal in the automatic adjusting circuit $C_6$ of the color-temperature state R, an input interface $I_{47}$ of the G control signal in the automatic adjusting circuit $C_7$ of the color-temperature state G, and an input interface $I_{58}$ of the B control signal in the automatic adjusting circuit Ca of the color-temperature state B.

An interface $O_{60}$ adjusting the channel of the color-temperature R, which will be connected with a channel circuit $C_0$ to be modulated, is connected to the R automatic adjusting circuit $C_6$. An interface $O_{70}$ of the automatic adjusting channel of the color-temperature state G, which will be connected with the channel of the color-temperature state G, and which will be connected with the channel circuit Co to be modulated, is connected to the previous G automatic adjusting circuit $C_7$. An interface $O_{80}$ adjusting the channel of the color-temperature state R is also connected with the channel circuit Co to be modulated, and is input to the B automatic adjusting circuit $C_8$.

An input interface $I_{02}$ of the chrominance or brightness signal is connected to the sample circuit $C_2$ of the color-temperature adjusting origin level. An output interface $O_{23}$ of the adjusting origin level R, an output interface $O_{24}$ of the adjusting origin level G, and an output interface $O_{25}$ of the adjusting origin level B in the sample circuit $C_2$ are separately connected with an input interface $I_{26}$ of the adjusting origin level R in the previous R automatic adjusting circuit $C_6$. An input interface $I_{27}$ of the adjusting origin level G in the G automatic adjusting circuit $C_7$, and an input interface $I_{28}$ of the adjusting origin level B in the B automatic adjusting circuit $C_8$ are separately connected with an input interface $I_{23}$ of adjusting origin level R in the previous R control circuit $C_3$, an input interface $I_{24}$ of adjusting origin level G in the previous G control circuit $C_4$, and an input interface $I_{25}$ of the adjusting origin level B in the previous B control circuit $C_5$.

Upon condition that circuits $C_4$ and $C_7$ as well as the input interfaces $I_{26}$ and $I_{28}$ of the adjusting origin levels R and B can be neglected, and that the adopted bottom color-temperature standard $D_L$ and the adopted top color-temperature standard $D_H$ are separately set in the continuous regions of 5400 K–7900 K or 6500 K–7900 K, and 7900 K–9300 K or 7900 K–10000 K in the Planckian locus band, the circuit $C_1$ will now be described With reference to FIG. 2. A positive pole of a voltage regulator diode $D_1$ is used as an R input terminal $I'_{01}$ of a chrominance signal input interface $I_{01}$. A negative pole of $D_1$ is used as the output interface $O_{13}$ of ident signal R of the color-temperature range, and is connected with an end of a resistor $R_1$. The other end of $R_1$ is connected to ground. The positive pole of a voltage regulator diode $D_3$ is used as a G input terminal $I''_{01}$ of a chrominance signal input interface $I_{01}$. A negative pole of $D_1$ is connected with a non-central terminal of a potentiometer $W_2$. The other non-central terminal of $W_2$ is connected with an end of a potentiometer $R_7$. A center terminal of $W_2$ is connected with a positive pole of a diode $D_5$. The other end of $R_7$ is connected to ground. A positive pole of a voltage regulator diode $D_2$ is used as a B input terminal $O'''_{01}$ of the chrominance signal input interface $I_{01}$. A negative pole of $D_2$ is connected with a non-central terminal of a potentiometer $W_1$. The other non-central terminal of $W_1$ is connected with a terminal of a resistor $R_6$. A center terminal of $W_1$ is connected with a positive pole of a diode $D_4$. The other end of $R_6$ is connected to ground. A terminal where a negative pole of $D_4$ is connected with a negative pole of $D_5$ is used as the output terminal $O_{15}$ of ident signal B of the color-temperature range.

The circuit $C_2$ will now be described with reference to FIG. 2. It is provided within the above circuit $C_1$. The circuit $C_2$ is comprised of voltage regulator diodes $D_1$, $D_2$, $D_3$, potentiometers $W_1$, $W_2$, diodes $D_4$, $D_5$, and is in a same connection path of the above circuit $C_1$. Positive poles of $D_1$, $D_2$, and $D_3$ are set as the R, G, B input terminals $I'_{02}$, $I_{02}''$ and $I_{02}'''$ of the chrominance or luminance signal input interface $I_{02}$. A negative pole of $D'_1$ is set as the R output interface $O_{23}$ of the adjusting origin level. A negative pole of $D_4$ is set as the B output interface $O_{25}$ of the adjusting origin level.

On condition that circuits $C_4$ and $C_7$ as well as the input interfaces $I_{26}$ and $I_{28}$ of the adjusting origin levels R and B can be neglected, and that the adopted bottom color-temperature reference standard $D_L$ and the adopted top color-temperature reference standard $D_H$ are separately set in the continuous ranges of 5400 K–7900 K or 6500 K–7900 K, and 7900 K–10000 K in the Planckian locus band, the above control circuit $C_3$ of the color-temperature R is comprised of the following. Bases of two NPN transistors $B_{11}, BG21$ are connected to each other and are used as the input interface $I_{13}$ of the ident signal R of the color-temperature range and the input interface $I_{23}$ of adjusting origin level R. The emitter of $BG_{11}$ is connected with the collector of a PNP transistor $BG_{12}$ and is used as a terminal $O'_{36}$ of the output interface $O_{36}$ of the R control signal as well. The collector of $GB_{11}$ is connected with the base of $BG_{12}$ and the emitter of $BG_{12}$ is connected with the emitter of a PNP transistor $BG_{22}$ and is used as the second terminal $O''_{36}$ of the output interface $O_{36}$. The base of $BG_{22}$ is connected with the collector of $GB_{21}$, and the collector of $BG_{22}$ is connected with the emitter of $GB_{21}$ and is used as the third terminal $O'''_{36}$ of the output interface $O_{36}$.

On condition that circuits $C_4$ and $C_7$ as well as the input interfaces $I_{26}$ and $I_{28}$ of the adjusting origin levels R and B can be neglected, and that the adopted bottom color-temperature reference standard $D_L$ and the adopted top color-temperature reference standard $D_H$ are separately set in the continuous portions of the ranges 5400 K–7900 K or 6500 K–7900 K and 7900 K–9300 K or 7900 K–10000 K in the Planckian locus band, the above control circuit $C_5$ of the color-temperature B comprises the following. Bases of two NPN transistors $BG_{31}$, $GB_{41}$ are connected to each other and are used as an input interface $I_{15}$ of the ident signal B of the color-temperature range and the input interface $I_{25}$ of adjusting origin level B. The emitter of $BG_{31}$ is connected with the collector of PNP transistor $BG_{32}$ and is used as a terminal $O'_{58}$ of the output interface $O_{58}$ of the B control signal as well. The collector of $BG_{31}$ is connected with the base of $BG_{32}$, and the emitter of $BG_{32}$ is connected with +12V power source. The emitter of a PNP transistor $BG_{42}$ is used as the second terminal $O''_{58}$ of the output interface $O_{58}$. The base of $BG_{42}$ is connected with the collector of $BG_{41}$. The collector of $BG_{42}$ is connected with the emitter of $BG_{41}$ and is used as the third terminal $O'''_{58}$ of the output interface $O_{58}$. When the primary color driver matrix circuit is corrected, it is used as a Y input terminal.

Figure 2:
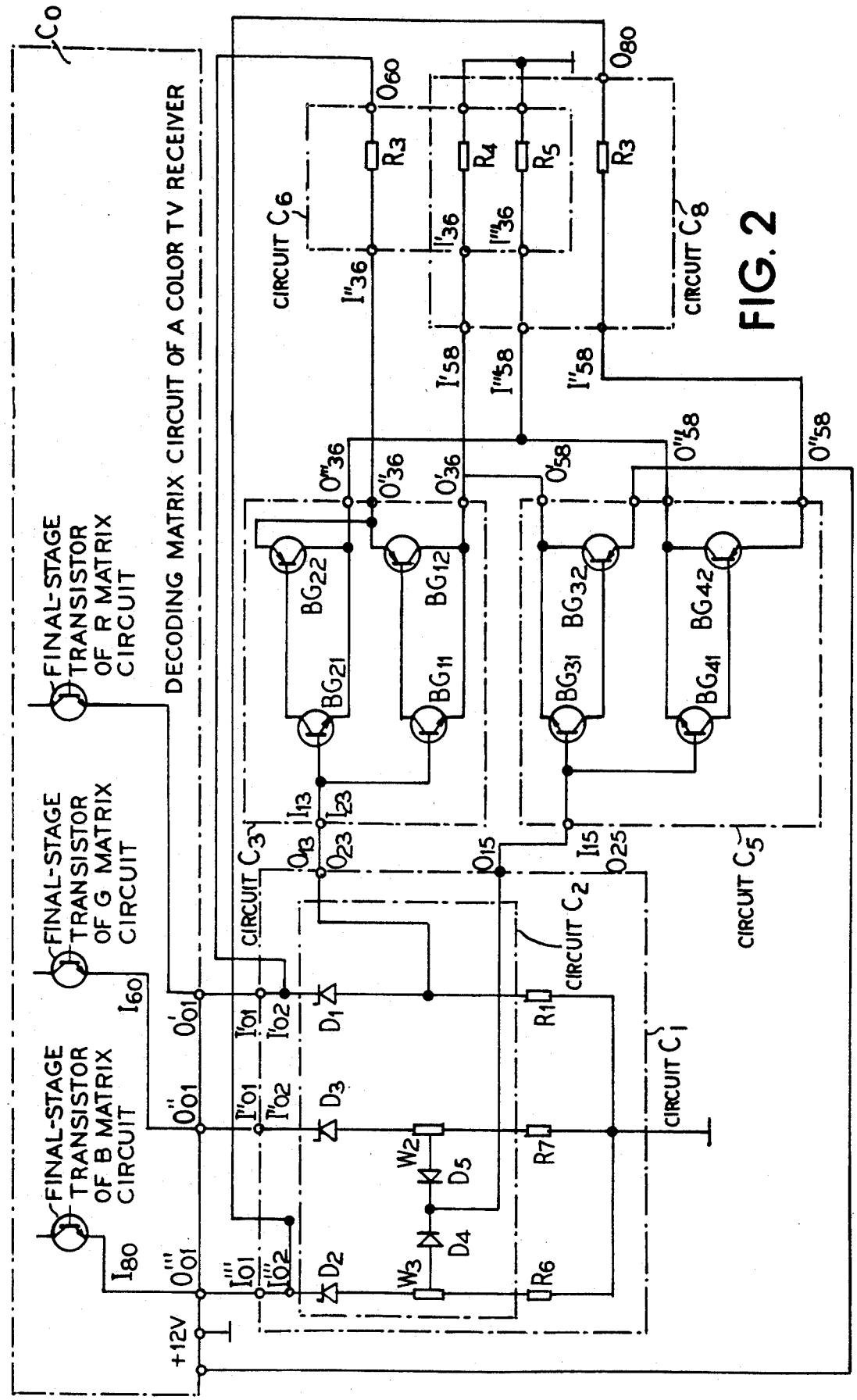
FIG. 2 shows a schematic diagram of one embodiment of an apparatus according to the present invention.

On condition that circuits $C_4$ and $C_7$ as well as the input interfaces $I_{26}$ and $I_{28}$ of the adjusting origin levels R and B can be neglected, and that the adopted bottom color-temperature reference standard $D_L$ and the adopted top color-temperature reference standard $D_H$ are separately set in the continuous portions of 5400 K–7900 K or 6500 K–7900 K and 7900 K–9300 K or 7900 K–10000 K in the Planckian locus band, as shown in FIG. 2, the above automatic adjusting circuit $C_6$ of color-temperature state R comprises the following. A terminal of a resistor $R_4$ is used as a terminal $I'_{36}$ of the input interface $I_{36}$ of the R control signal. The other terminal of $R_4$ is connected to ground. A terminal of a resistor $R_2$ is used as the second terminal $I''_{36}$ of the input interface $I_{36}$. The other terminal of $R_2$ is used as the B automatic adjusting channel interface $O_{60}$ of the color-temperature state. The second terminal $O_{60}$ is also connected with the input interface $I_{01}$ in the previous sample circuit $C_1$. A terminal of a resistor $R_5$ is used as a third terminal $I'''_{36}$ of the input interface $I_{36}$. The other end of $R_5$ is connected to ground.

As shown in FIG. 2, the above automatic adjusting circuit $C_8$ of the color-temperature state B comprises the following. A terminal, which has been used as $I'_{36}$ and is from the same resistor $R_4$ in the above circuit $C_6$, is also used as a terminal $I'_{58}$ of the input interface $I_{58}$ of the B control signal. The other terminal of $R_4$ is connected to ground. A terminal of a resistor $R_5$ is used as the second terminal $I''_8$ of the input interface $I_8$. The other terminal of $R_5$ is used as the B automatic adjusting channel interface $O_{80}$ of the color-temperature state and is also connected with the third terminal $I'''_{01}$ of the input interface $I_{01}$ in the previous sample circuit $C_1$. The terminal, which has been used as $I'''_{36}$ and is from the same resistor $R_5$ in the above circuit $C_6$, is also used as the third terminal $I'''_{58}$ of the input interface $I_{58}$. The other terminal of $R_5$ is connected to ground.

A first terminal $I'_{01}$ (which is the interface $O_{60}$ and the first terminal $I'_{02}$ of the interface $I_{02}$), the second terminal $I''_{01}$ (which is the second terminal $I_{02}$ of the interface $I_{02}$), and the third terminal $I'''_{01}$ (which is the interface $O_{80}$ and the third terminal $I'''_{02}$ of the interface $I_{02}$ of above adjuster interface $I_{01}$) are separately connected with final-stage transistor emitters of the R, G, B matrix circuits of an adjusted receiver. A positive 12V power source and a ground terminal are separately and respectively connected with the +12V terminal of the decoding matrix circuits and the ground terminal of the adjusted receiver.

With the method and apparatus according to the invention, an instantaneous chrominance signal or a brightness signal is obtained from a proper position of TV equipment by means of the ident circuit of the corresponding relation between hue and color-temperature and the sampling circuit of the origin level for the color-temperature correction. Then the corresponding relation between hue and color-temperature is distinguished according to the above selected correspondence principle between the hue and color-temperature parameters. The correcting origin level which is required to set up dynamic correction for various primary colors R, G, B is obtained therefrom. Then the corresponding control signal emitted by means of a color-temperature control circuit according to the ident signal of the color-temperature range and the signal of the correcting origin level, which are delivered by the above circuit, is applied to the color-temperature automatic correcting circuit. The control signal will correct the equipment to the dynamic color-temperature state by means of the installed color-temperature channel and will always control the white balance color-temperature parameter in the stated dynamic range and submit to the state of the corresponding relation between the hue and color-temperature parameters. On condition that an approximate design is permitted, for example, in the plan concerning the selection of R, G, B primary colors in China now, the above calculation shows that the ratio between the G contents of D and D only differs by 0.2% so that they can be considered to be equal. The elements need to be saved, the subcircuits, and the signal distribution of the adjuster can be partly not used. For example, in some implementations, the G control and the adjusting circuit for the origin level inputs for the control circuit and the apparatus circuit etc. are left out. It is thus possible to share, mutually or partly, the elements and the signal channels so that two or several block circuits can be compounded or partly compounded as one.

When the apparatus is to be used, first it is switched into a color TV receiver with the above requirements. White signals are input into the receiver and the potentiometers $W_1$, $W_2$ are corrected to the state electrically directly connecting $D_2$ with $D_4$ and $D_5$ with $D_6$. At this moment, $BG_{11}$, $BG_{12}$, $BG_{21}$, and $BG_{22}$ are cut off and $BG_{31}$, $BG_{32}$, $BG_{41}$ and $BG_{42}$ are switched on. Then the white balance of the apparatus is corrected according to the reference white at a relative color temperature of 9300 K. The present joint currents of the final emitters in the matrix circuits R and B are separately supposed to be $I_R$, $I_B$. $W_1$, $W_2$ are again corrected so as to allow the color-temperature range ident voltage $V_8$ of the $I_{15}$ terminal to be about 0.1 V higher than that of the $I_{13}$ terminal. In this way, when the receiver receives a non-warm color image signal, that is $V_R > V_8$ and $V_R \leq V_G$, the matrix circuit maintains an above white balance dynamic color-temperature parameter at a 9300 K work state. Only when $V_R - V_B = 0.1 - 0V$, is the work state at 7900 K–9300 K. When the receiver receives a warm color image signal, that is $V_R > V_B$ and $V_R > V_G$, $BG_{11}$, $BG_{12}$, $BG_{21}$, and $BG_{22}$ are switched on and $BG_{31}$ $BG_{32}$, $BG_{41}$, and $BG_{42}$ are cut off so that the final emitter current, which is approximately equal to the collector current, in the R matrix circuit, increases by $\Delta I_R$. The final emitter current in the B matrix circuit, which is approximately equal to the collector current, also increases by $\Delta I_B$. The values of the increases $\Delta I_R$ and $\Delta I_B$ depend upon the selection of circuit parameters. When a group of parameters are selected so that $\Delta I_R/I_R = 41.4\%$, $\Delta I_R/I_B = 14.4\%$, the receiver will change from a 9300 K dynamic color-temperature state to a 6504 K dynamic color-temperature state. Only when $V_R - V_B = 0-0.1V$, is it in the 6504 K–7900 K state. Afterwards, any chrominance signals are first sampled by $D_1$, $D_3$, $W_2$, $D_2$, $W_1$ separately. After G, B signals are compared by means of $D_4$, $D_5$, one which has the higher level among them is input to $I_{15}$ and is compared with the R signal at $I_{13}$. Then the one which has a higher level between them is switched on in a relative circuit so that a relative resistor is put into the matrix circuit to operate a stated correction—where the correcting origin level is determined by the regulated voltages $D_1$, $D_2$, and $D_3$.

An advantage of this invention is that given a condition which assures that the chrominance and luminance of image details are not distorted or are not mainly distorted, the optimum white balance color-temperature parameters corresponding to various hues are selected to give consideration to TV equipment which has good reproducing results for various images.

Another advantage of this invention is to provide an error structure having good suitability. In fact, it is not possible to avoid errors because the color TV is a kind of approximate image reproducing technique which is subordinated to characters of human vision resulting in subjective evaluation to a great extent with addition of the effects of various factors produced when signals transmit (for example, the bandwidth of a chrominance signal is limited to 1.3MHz in what is called large area color program for compatibility, such as the intrinsic large error for $D_{65}$, $D_{93}$ references). Eliminating inferior errors which can make image quality decrease apparently as much as possible and properly controlling non-inferior errors which do not make image quality decrease, is valuable. The errors structure characteristics of the automatic correcting method in this invention are as follows.

First, take the fidelity combining the distortionless chrominance parameter with the distortionless visual result as suitable to determine the applicable range in the Planckian locus band as a color-temperature dynamic range so that the fidelity is raised.

Secondly, take the subjective evaluating results as suitable to determine the allowable deviation direction in "warm hue-warm color temperature" and "cold hue-cold color temperature."

This kind of error structure prevents the TV set from being in the inferior range of the intrinsic reproducing image in an existing single fixation color-temperature reference program. Even if it still has proper errors, the results appear that the skin color appears slightly red, white color appears slightly blue, green mountains appear very green, and blue water appears very blue, and do not appear undesirable. The effects of errors are limited in the range which can be accepted by a subjective evaluation. That has a similar function with the tolerance basic shaft system and the correlation tolerance. For the intrinsic inferior errors of the input signal, this kind of error structure can produce offsetting or even correcting results, and is analogous to a kind of prestressing force.

In this invention, a G correction way is neglected in some of the embodiments. This kind of neglect does not mainly influence the fidelity of the primary color ratio because the difference of the G ratios between $D_{93}$ and $D_{65}$ is only 0.2%. When the apparatus makes a receiver correct the $D_{93}$ state to be the $D_{65}$ state (assuming present values of every primary color to be 1, that is $R_{93} = G_{93} = B_{93} = 1$ and brightness to be $Y_{93}$, and assuming present values of primary colors to be $R_{65}$, $G_{65}$, $B_{65}$ and brightness to be $Y_{65}$), according to the brightness formulas in chromatics theory:

$$Y_{93} = 0.30 \times 1 + 0.59 \times 1 + 0.11 = 1$$

$$Y_{65} = 0.30 \times 1.414 + 0.59 \times 1 + 0.11 \times 0.856 = 1.1.$$

This makes the brightness value increase 10% (when hue changes, the brightness can not increase more because of the limiting action of $R_2$). But, just as what was shown in the Evaluating Report of the First Conference Comparing and Appraising the Quality of Color TV Sets in China, "under the condition of same brightnesses, the brightness impression of 9300 K white color temperature is more than that of 6500 K white color temperature." Therefore, increasing brightness by about 10% with the $D_{65}$ color temperature state has just as good a compensation for the visual brightness of a warm color image so as to reach a balance (because of the actions of $D_1$, $D_2$, and $D_3$, the black level reference as a correcting origin is assured of always remaining steady during dynamic correcting). While the black and white image is shown because $V_R = V_B$, the dynamic color temperature state returns to 9300 K and the brightness returns to the original state. If it is required to let the brightness value always remain constant, the only need is to add the G control correcting circuit (see FIG. 3) and to properly select the parameters so that the R increasing rate is 0.285, the G increasing rate is 0.091, and the B increasing rate is 0.222 when the dynamic color temperature state changes from $D_{93}$ to $D_{65}$.

The apparatus according to the invention is relatively independent and the number of components is not very great. Except for potentiometers, all components are able to be integrated into a small piece of an integrated circuit with 5 or 7 lead-out terminals. The integrated device is installed in a proper place in or at the tail plate of the TV picture tube. After it is corrected in simple fashion, it will be possible to accomplish the above functions. It is not only convenient for large scale production, but also it is possible to use it to improve a TV set without changing the original circuit. The apparatus can be made by discrete elements, or provided in the existing circuit. For TV productions possessing good consistency, the correcting potentiometers $W_1$ and $W_2$ can be neglected and it is not necessary to be corrected after the circuit is added and welded on.

What is mentioned above is proven by testing and measuring the circuit and watching a sample equipment test. Thus, it achieves the objective of this invention.

In the first embodiment of the invention shown in FIG. 2, the circuit correcting mode and relative elements in the apparatus are the same as the circuit connecting mode and relative elements in the apparatus of FIG. 1, except that the circuit $C_4$, $C_7$ and the input interfaces $I_{26}$, $I_{28}$ of the adjusting origin levels R, B can be neglected, and thus are not present in FIG. 2.

Ranges for selecting the elements of the apparatus are $R_1$, $R_6$,$R_7$: 10-20K $\Omega$; $R_2$,$R_3$: 500-3.9K $\Omega$ $R_4$: 2.7-6.8K$\Omega$; $R_5$: 4.7-12K $\Omega$; and $W_1$, $W_2$: 1-2.7K $\Omega$. Reversal restoring times of D4 and D5 are less than 5ns. Low current regulated voltage values of $D_1$, $D_2$, and $D_3$ are selected with reference to the average black levels, assuring that the primary color correcting rates for bright or dark images are the same. Transistor junction capacity is small. $BG_{11}$-$GB_{44}$ are low power transistors for which $h_{FE}>50$, $f_T>100$MH. It is best to choose differential symmetry transistors for these low power transistors.

The operating process of the apparatus has been stated above. It has a simple structure and good characteristics, and is suitable to be used by a receiver.

Figure 3:
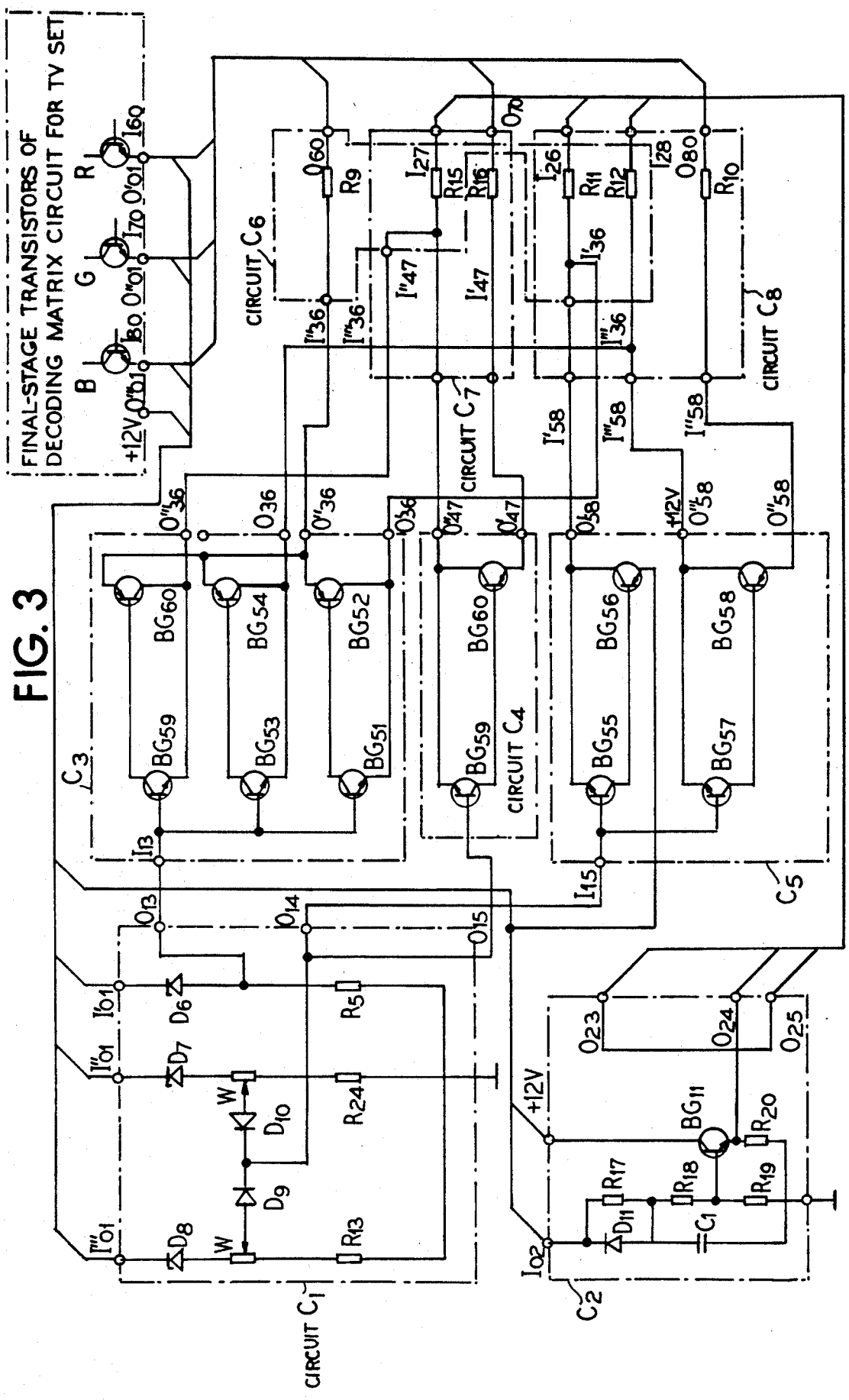
FIG. 3 is a schematic diagram of a second embodiment of an apparatus according to the present invention.

Referring to the second embodiment of FIG. 3, the apparatus shown is for the condition when circuits $C_4$ and $C_7$ are not allowed to be neglected. The first embodiment is a simplified case of the second embodiment. There is a more accurate color-temperature correcting origin level in the sample circuit used in the second embodiment, which takes the place of the circuit in the first embodiment. The circuit is composed of NPN transistor $BG_{61}$, resistors $R_{17}$, $R_{18}$, $R_{19}$, diode $D_{11}$, capacitor $C_1$, and a clamper circuit used to track the random black level. It has added thereto the G control circuit $C_4$, which is composed of transistors $BG_{59}$, $BG_{60}$, and the G correcting circuit, which is composed of resistors $R_{15}$, $R_{16}$. They are connected with each other as shown in FIG. 3. This circuit separately corrects R, G, B increasing rates to 0.285, $-0.091$, $-0.222$ in the $D_{93} \rightarrow D_{65}$ state. Therefore, it will assume that the brightness remains constant when the $D_{93}$ state is automatically corrected to the $D_{65}$ state, as mentioned above.

Figure 4:
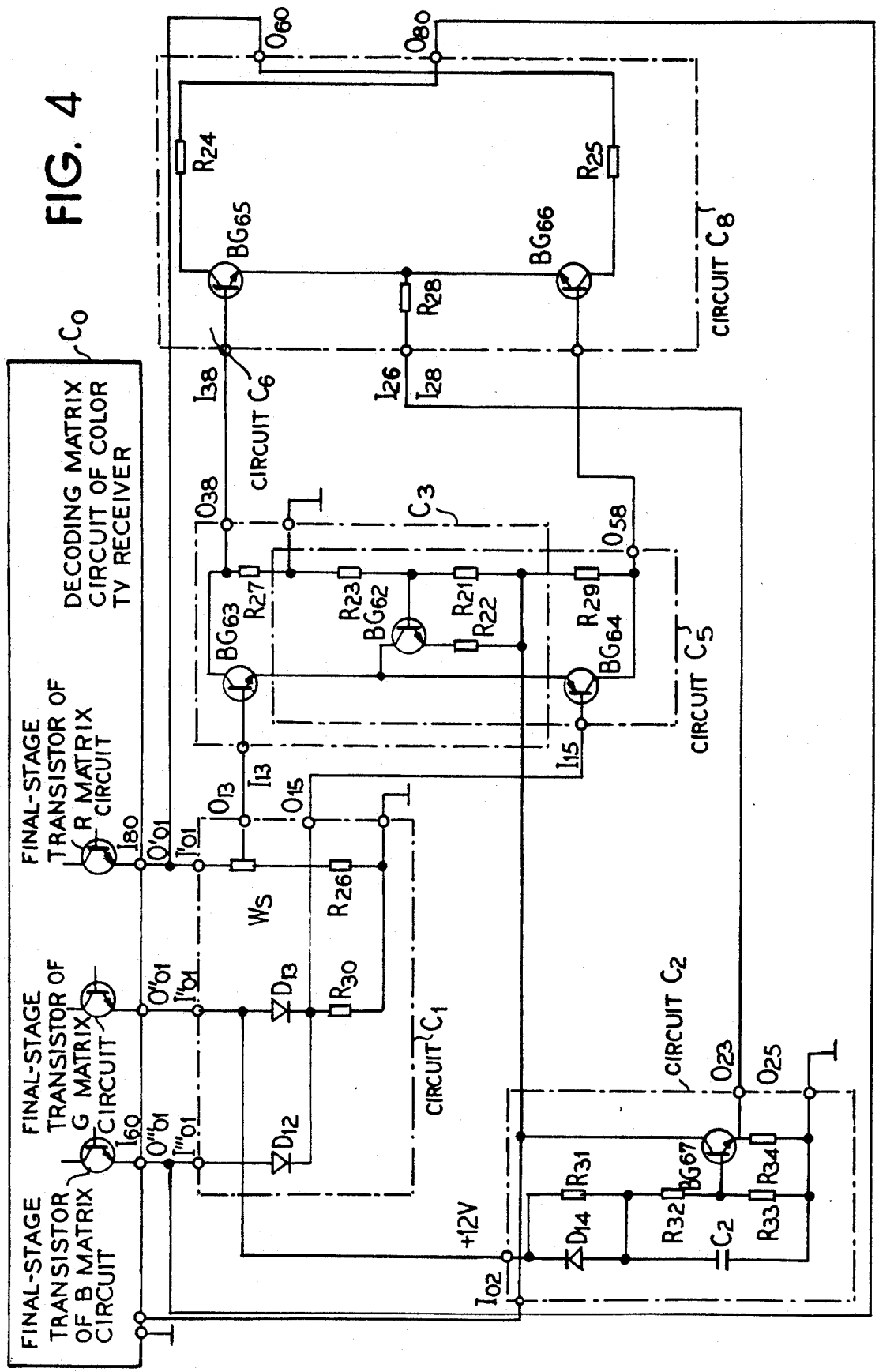
FIG. 4 is a schematic diagram of a third embodiment of an apparatus according to the present invention.

The third embodiment of FIG. 4 is another circuit mode, on the condition that the $C_4$, $C_7$ circuits are neglected. Its sample circuit $C_1$ is composed of diodes $D_{12}$, $D_{13}$, resistors $R_{26}$, $R_{30}$ and a potentiometer $W_5$. Its sample circuit $C_2$ is composed of a transistor $BG_{67}$, a diode $D_{14}$, a capacitor $C_2$, and resistors $R_{31}$, $R_{32}$, $R_{33}$, $R_{34}$. R and B control circuits $C_3$ and $C_5$ are separately composed of transistors $BG_{62}$, $G_{63}$, $Bg_{64}$, resistors $R_{21}$, $R_{22}$, $R_{27}$ and a transistor $BG_{64}$, and resistors $R_{21}$, $R_{22}$, and $R_{29}$. The two circuits share $BG_{62}$, $R_{21}$, $R_{22}$, and $R_3$. R and B correcting circuits $C_6$ and $C_8$ are composed of transistors $BG_{65}$, $BG_{66}$, resistors $R_{24}$, $R_{25}$, and $R_{26}$, which are also shared by the two circuits. The internal connection is shown in FIG. 4. It is connected with the receiver matrix circuit by means of the same methods as the first embodiment.

In a fourth embodiment of the apparatus for automatically adjusting dynamic color-temperature of color TV equipment, a division device is installed in the sample circuit C of the ident signal of the corresponding relation between hue and color-temperature, and the corresponding relation between instantaneous hue and color-temperature is distinguished according to the corresponding principle of the above selected hue—color temperature. When a receiver receives warm images, $V_R/V_G>1$ and $V_R/V_B>1$. Both values represent an objective hue characteristic under the circumstances. Otherwise, it may be considered that the receiver receives other hue chrominance signals. Its feature is to use the first color-temperature region ident signal to control the next field hue.

Although various minor changes and modifications might be proposed by those skilled in the art, it will be understood that I wish to include within the claims of the patent warranted hereon all such changes and modifications as reasonably come within my contribution to the art.

We claim as our invention:

1. A method for automatically adjusting dynamic color temperature state of color TV equipment, said color TV equipment having a chrominance channel circuit which has chrominance signals input thereto, comprising the steps of:
   a) selecting an applicable range along a planckian locus color temperature band as a dynamic color temperature reference standard of a white balance color temperature parameter in accordance with color temperature of a chrominance signal input to said chrominance channel circuit;
   b) sampling the chrominance signal input to said chrominance channel circuit and adjusting said color temperature state based on instantaneous hue characteristics of each pixel in every scanning line of a frame of an image corresponding to said chrominance signal in accordance with said selected dynamic color temperature reference standard and such that said white balance color temperature parameter is adjusted from a point $K_0$ on a CIE chrominance chart, corresponding to normalized RGB color space primary color quantities $R_0$, $G_0$, $B_0$ and brightness $Y_0$, to a point $K_1$ on the CIE chrominance chart, corresponding to normalized RGB color space primary color quantities $R_1$, $G_1$, $B_1$ and brightness $Y_1$, wherein $K_1$ is less than $K_0$, and wherein
   1) a deviation of points $(S_0, Y_0)$, $(X_1, Y_1)$ on said CIE chrominance chart corresponding to the RGB color space points $(R_0, G_0, B_0)$, $(R_1, G_1, B_1)$ from corresponding Planckian locus points $D_0'$, $K_1'$ is less than or equal to 27 MPCD, and
   2) an increase or decrease of brightness of any part of said frame after adjustment does not exceed 15% as compared with that before adjustment.

2. A method according to claim 1 wherein, for a relatively precise design, a low color temperature range between 2000 K-9300 K along said Planckian locus band is adopted as said dynamic color temperature reference standard of the white balance color temperature parameter when said chrominance channel circuit is input with a warm color chrominance signal wherein a signal level R in a primary color structure of the chrominance signal is greater than both signal levels B and G, said low color temperature range being known as a bottom section color temperature standard $D_L$.

3. A method according to claim 1 wherein, for an approximate design, at least one point in said low color temperature range between 2000 K-9300 K along said Planckian locus band is adopted as said dynamic color temperature reference standard of the white balance color temperature parameter when said chrominance channel circuit is input with a warm color chrominance signal wherein a signal level R in a primary color structure of the chrominance signal is greater than both signal levels B and G, said at least one point being known as a bottom section color temperature standard $D_L$.

4. A method according to claim 1 wherein, for a relatively precise design, when said chrominance channel circuit is input with a non-warm color chrominance signal, a region between an upper limit of a bottom-section color temperature standard $D_L$ and 28000 K is adopted as said dynamic color temperature standard, said region being known as a top-section color-temperature reference standard $D_H$.

5. A method according to claim 1 wherein, for an approximate design, at least one point in a region between an upper limit of a bottom-section color temperature standard $D_L$ and 28000 K is adopted as said dynamic color temperature reference standard, said at least one point being known as a top-section color temperature reference standard $D_H$.

6. A system for automatically adjusting dynamic color temperature state of color TV equipment, said color TV equipment having a chrominance channel circuit which has chrominance signals input thereto, comprising:

means for selecting an applicable range along a Planckian locus color temperature band as a dynamic color temperature reference standard of a white balance color temperature parameter in accordance with color temperature of a chrominance signal input to said chrominance channel circuit;

means for sampling the chrominance signal input to said chrominance channel circuit and adjusting said color temperature state based on instantaneous hue characteristics of each pixel in every scanning line of a frame of an image corresponding to said chrominance signal in accordance with the dynamic color temperature reference standard selected by said selecting means and such that said white balance color temperature parameter is adjusted from a point $K_0$ on a CIE chrominance chart, corresponding to normalized RGB color space primary color quantities $R_0$, $G_0$, $B_0$ and brightness $Y_0$, to a point $K_1$ on the CIE chrominance chart, corresponding to normalized RGB color space primary color quantities $R_1$, $G_1$, $B_1$ and brightness $Y_1$, wherein $K_1$ is less than $K_0$, and wherein 1) a deviation of points $(X_0, Y_0)$, $(X_1, Y_1)$ on said CIE chrominance chart corresponding to the RGB color space points $(R_0, G_0, B_0, (R_1, G_1, B_1)$ from corresponding Planckian locus points $K_0'$, $K_1$ is less than or equal to 27 MPCD, and 2) an increase or decrease of brightness of any part of said frame after adjustment does not exceed 15% as compared with that before adjustment.

7. An apparatus for automatically adjusting dynamic color temperature state for use in color TV equipment, said color TV equipment having a color chrominance channel circuit which has chrominance signals input thereto, comprising:

first means for sampling an ident signal relation between hue and color temperature, and having an input connected to receive a color chrominance signal input to said color chrominance channel circuit, and R, G, and B signal outputs;

second means for sampling of color temperature adjusting origin level, and having an input for receiving said color chrominance signal input to said color chrominance channel circuit, and three outputs for respectively outputting adjusting origin level RGB signals;

first means for controlling said R signal so as to control a color temperature state and having two inputs respectively connected to receive said R signal output from said first sampling means and said adjusting origin level R signal from said second sampling means, and an output for outputting an R control signal;

second means for controlling said G signal so as to control said color temperature state and having two inputs respectively connected to receive said G signal output from said first sampling means and said adjusting origin level G signal from said second sampling means, and an output for outputting a G control signal;

third means for controlling said B signal so as to control said color temperature state and having two inputs respectively connected to receive said B signal output from said first sampling means and said adjusting origin level B signal from said second sampling means, and an output for outputting a B control signal;

first means for automatically adjusting said R signal so as to adjust color temperature state and having an input connected to said output of said first controlling means to receive said R color signal and another input for receiving said adjusting origin level R signal from said second sampling means and having an output for providing an R adjustment signal to said chrominance channel circuit;

second means for automatically adjusting said G signal so as to adjust color temperature state and having an input connected to said output of said second controlling means to receive said G color signal and another input for receiving said adjusting origin level G signal from said second sampling means and having an output for providing a G adjustment signal to said chrominance channel circuit; and third means for automatically adjusting said B signal so as to adjust color temperature state and having an input connected to said output of said third controlling means to receive said B color signal and another input for receiving said adjusting origin level B signal from said second sampling means and having an output for providing a B adjustment signal to said chrominance channel circuit.

* * * * *